(12) United States Patent
Ebrahimi

(10) Patent No.: US 10,007,913 B2
(45) Date of Patent: *Jun. 26, 2018

(54) IDENTITY MANAGEMENT SERVICE USING A BLOCKCHAIN PROVIDING IDENTITY TRANSACTIONS BETWEEN DEVICES

(71) Applicant: ShoCard, Inc., Palo Alto, CA (US)

(72) Inventor: Armin Ebrahimi, Palo Alto, CA (US)

(73) Assignee: ShoCard, Inc., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/146,872

(22) Filed: May 4, 2016

(65) Prior Publication Data

US 2016/0328713 A1 Nov. 10, 2016

Related U.S. Application Data

(60) Provisional application No. 62/157,256, filed on May 5, 2015, provisional application No. 62/304,934, filed on Mar. 7, 2016.

(51) Int. Cl.
*G06Q 20/40* (2012.01)
*H04L 9/30* (2006.01)
(Continued)

(52) U.S. Cl.
CPC ......... *G06Q 20/4014* (2013.01); *G06F 21/31* (2013.01); *G06F 21/34* (2013.01);
(Continued)

(58) Field of Classification Search
None
See application file for complete search history.

(56) References Cited

U.S. PATENT DOCUMENTS 5,005,200 A * 4/1991 Fischer ............... G06F 21/00
380/30
5,901,229 A * 5/1999 Fujisaki ............... G06Q 20/02
380/30
(Continued)

OTHER PUBLICATIONS

"Could the Bitcoin network be used as an ultrasecure notary service?", May 23, 2013.*
(Continued)

*Primary Examiner* — Mamon Obeid
(74) *Attorney, Agent, or Firm* — Martine Penilla Group, LLP

(57) ABSTRACT

Logic on a first remote device causes the capture of personal data identifying a user from an identification card. The logic generates a hash value from the personal data using a hashing algorithm and signs the hash value with a digital signature created using a private key paired with a public key. The logic transmits, over a network, the signed hash value and the public key from the remote device to a distributed public database for storage. The logic receives, over the network, a transaction number from the distributed public database. The logic then transmits the transaction number and the personal data to a second remote device. Logic on the second remote device verifies that the hash value in the signed hash value is the same as a generated hash value and verifies that the signed hash value was signed with the private key.

22 Claims, 8 Drawing Sheets

(51) Int. Cl.

| | | |
|---|---|---|
| *H04L 9/32* | (2006.01) | |
| *H04L 9/14* | (2006.01) | |
| *H04L 9/06* | (2006.01) | |
| *H04W 12/06* | (2009.01) | |
| *H04W 12/04* | (2009.01) | |
| *G06K 19/06* | (2006.01) | |
| *G06F 21/31* | (2013.01) | |
| *G06Q 20/02* | (2012.01) | |
| *G06Q 20/32* | (2012.01) | |
| *G06Q 20/38* | (2012.01) | |
| *G06F 21/34* | (2013.01) | |
| *G06F 21/64* | (2013.01) | |

(52) U.S. Cl.
CPC ....... *G06F 21/64* (2013.01); *G06K 19/06028* (2013.01); *G06K 19/06037* (2013.01); *G06Q 20/02* (2013.01); *G06Q 20/3276* (2013.01); *G06Q 20/3825* (2013.01); *G06Q 20/3827* (2013.01); *H04L 9/0637* (2013.01); *H04L 9/0643* (2013.01); *H04L 9/14* (2013.01); *H04L 9/30* (2013.01); *H04L 9/302* (2013.01); *H04L 9/3066* (2013.01); *H04L 9/3236* (2013.01); *H04L 9/3239* (2013.01); *H04L 9/3249* (2013.01); *H04L 9/3252* (2013.01); *H04W 12/04* (2013.01); *H04W 12/06* (2013.01); *G06Q 2220/00* (2013.01)

(56) References Cited

U.S. PATENT DOCUMENTS

| | | | | |
|---|---|---|---|---|
| 5,923,763 | A * | 7/1999 | Walker | H04L 9/3271 380/51 |
| 5,996,076 | A * | 11/1999 | Rowney | G06F 21/445 705/76 |
| 6,088,717 | A * | 7/2000 | Reed | H04L 29/06 707/999.01 |
| 6,310,966 | B1 * | 10/2001 | Dulude | G06Q 20/04 382/115 |
| 6,792,536 | B1 * | 9/2004 | Teppler | G06F 21/64 713/178 |
| 8,078,880 | B2 * | 12/2011 | Nanda | H04L 63/102 709/203 |
| 8,502,060 | B2 * | 8/2013 | Ribner | G10G 7/02 84/454 |
| 9,059,858 | B1 | 6/2015 | Giardina | H04L 9/3226 |
| 9,135,787 | B1 | 9/2015 | Russell | G07F 19/201 |
| 9,331,856 | B1 * | 5/2016 | Song | H04L 9/3247 |
| 9,397,985 | B1 * | 7/2016 | Seger, II | H04L 63/0442 |
| 9,722,790 | B2 * | 8/2017 | Ebrahimi | H04L 9/3066 |
| 9,876,646 | B2 * | 1/2018 | Ebrahimi | H04L 9/3265 |
| 2002/0138735 | A1 * | 9/2002 | Felt | G06Q 20/3829 713/176 |
| 2003/0046159 | A1 * | 3/2003 | Ebrahimi | G06Q 30/02 705/14.73 |
| 2003/0172273 | A1 * | 9/2003 | Hans | G06F 21/10 713/172 |
| 2004/0064693 | A1 * | 4/2004 | Pabla | H04L 63/02 713/168 |
| 2005/0039040 | A1 * | 2/2005 | Ransom | G01R 22/066 726/6 |
| 2005/0091495 | A1 * | 4/2005 | Cameron | G06F 21/31 713/175 |
| 2005/0114447 | A1 * | 5/2005 | Cameron | G06F 21/6245 709/204 |
| 2007/0016785 | A1 * | 1/2007 | Guay | H04L 9/3236 713/176 |
| 2007/0118479 | A1 * | 5/2007 | Halsema | G06F 21/6245 705/51 |
| 2008/0155253 | A1 * | 6/2008 | Liu | G06Q 20/02 713/51 |
| 2010/0088517 | A1 * | 4/2010 | Piersol | H04L 9/3236 713/171 |
| 2011/0307703 | A1 * | 12/2011 | Ogg | G06Q 20/382 713/176 |
| 2012/0297464 | A1 * | 11/2012 | Busch | G06F 11/1008 726/5 |
| 2013/0037607 | A1 | 2/2013 | Bullwinkel | |
| 2013/0014152 | A1 | 6/2013 | Maino et al. | |
| 2013/0145152 | A1 * | 6/2013 | Maino | H04L 63/0428 713/156 |
| 2013/0333009 | A1 * | 12/2013 | Mackler | G06F 21/31 726/7 |
| 2014/0006247 | A1 * | 1/2014 | Chai | G06Q 40/04 705/37 |
| 2014/0032913 | A1 * | 1/2014 | Tenenboym | H04L 9/321 713/176 |
| 2014/0304517 | A1 * | 10/2014 | Chidambaram | H04L 9/0841 713/176 |
| 2015/0081567 | A1 * | 3/2015 | Boyle | G06Q 20/3829 705/71 |
| 2015/0095352 | A1 * | 4/2015 | Lacey | G06F 17/30011 707/752 |
| 2015/0244690 | A1 * | 8/2015 | Mossbarger | H04L 63/061 713/171 |
| 2015/0262138 | A1 * | 9/2015 | Hudon | G06Q 20/065 705/39 |
| 2015/0269614 | A1 * | 9/2015 | Kramer | G06Q 30/0251 705/14.49 |
| 2015/0278820 | A1 * | 10/2015 | Meadows | G06Q 20/40145 705/64 |
| 2015/0302401 | A1 * | 10/2015 | Metral | G06Q 20/3829 705/71 |
| 2015/0332283 | A1 * | 11/2015 | Witchey | G06Q 30/018 705/3 |
| 2015/0365436 | A1 * | 12/2015 | Shenefiel | H04L 63/20 726/1 |
| 2016/0005032 | A1 * | 1/2016 | Yau | G06O 20/3678 705/69 |
| 2016/0012465 | A1 * | 1/2016 | Sharp | G06Q 20/18 705/14.17 |
| 2016/0028552 | A1 * | 1/2016 | Spanos | H04L 9/3297 713/178 |
| 2016/0072800 | A1 * | 3/2016 | Soon-Shiong | H04L 63/0861 726/7 |
| 2016/0098723 | A1 * | 4/2016 | Feeney | G06Q 20/4016 705/75 |
| 2016/0098730 | A1 * | 4/2016 | Feeney | G06Q 30/0185 705/71 |
| 2016/0180338 | A1 * | 6/2016 | Androulaki | G06Q 20/3829 705/71 |
| 2016/0203572 | A1 * | 7/2016 | McConaghy | G06F 21/10 705/58 |
| 2016/0212146 | A1 * | 7/2016 | Wilson | G06F 21/645 |
| 2016/0217436 | A1 * | 7/2016 | Brama | G06Q 20/06 |
| 2016/0261411 | A1 * | 9/2016 | Yau | H04L 63/0807 |
| 2016/0283939 | A1 * | 9/2016 | Finlow-Bates | G06Q 20/065 |
| 2016/0328713 | A1 * | 11/2016 | Ebrahimi | H04L 9/3066 |
| 2016/0330035 | A1 * | 11/2016 | Ebrahimi | H04L 9/3265 |
| 2017/0041296 | A1 * | 2/2017 | Ford | H04L 63/0421 |
| 2017/0180128 | A1 * | 6/2017 | Lu | H04L 9/321 |
| 2017/0200160 | A1 * | 7/2017 | Kumar | G06Q 20/405 |
| 2017/0255805 | A1 * | 9/2017 | Ebrahimi | G06K 7/1439 |
| 2017/0324711 | A1 * | 11/2017 | Feeney | H04L 63/0428 |

OTHER PUBLICATIONS

"Developer Creates Blockchain Passport Technology Based on Bitcoin", Oct. 31, 2014.*
"State in a Box Identity Services Architecture", Vinay Gupta, 2006-2009.*
"Create Your Own Blockchain ID", Christopher Ellis, Oct. 24, 2014.*
"Stampery Now Lets You Certify Documents Using the Blockchain and Your Real Identity", Romain Dillet, Nov. 20, 2015.*
"Your Next Passport Could Be on the Blockchain", John Biggs, Oct. 31, 2014.*

(56) References Cited

OTHER PUBLICATIONS

ISR & Written Opinion PCTUS1630863, dated Sep. 14, 2016, 10 pages.
Christoper Ellis, "Create Your Own Blockchain", Oct. 24, 2014, 14 pages.
Drew-Cordell, "Developer Creates Blockchain Passport Technology Based on Bitcoin", Oct. 31, 2014, 16 pages.
Jeremy Kirk, "Could the Bitcoin network be used as an ultrasecure notary service?", May 23, 2013, 3 pages.
John Biggs, "Your Next Passport Could Be On The Blockchain", Oct. 31, 2014, 6 pages.
Romain Dillet, "Stampery Now Lets You Certify Documents Using The Blockchain And Your Real Identity", Nov. 20, 2015, 6 pages.
Vinay Gupta, "State in a Box—Identity Services Architecture", 2006-2009, 42 pages.
International Search Report, PCT/16/30863, dated Sep. 14, 2016, 4pages.

\* cited by examiner

IDENTITY MANAGEMENT SERVICE USING A BLOCKCHAIN PROVIDING IDENTITY TRANSACTIONS BETWEEN DEVICES

CLAIM OF PRIORITY

This application claims priority to and the benefit of U.S. Provisional Patent Application No. 62/157,256 entitled "A User Identification Management System and Method" filed on May 5, 2015, and U.S. Provisional Patent Application No. 62/304,934 entitled "An Identity Management Service Using a Blockchain" filed on Mar. 7, 2016. The disclosures of both of those applications are incorporated herein for all purposes.

BACKGROUND

The present invention generally relates to systems and methods for managing the identity of users and of identifying those users to third parties. Identity theft causes tens of billions of dollars in losses every year.

In an effort to combat identity theft, systems and methods for identifying users to third parties have been developed. In a common two factor application, a user presents a bank card or credit card in addition to the personal identification number ("PIN") corresponding to the card. In other systems, a user provides a password to identify himself/herself and may be given a Short Message Service (SMS) text message with a unique code that the user must recite for access. In still other systems, a user may be given challenge questions to verify his/her identity. Each of these systems, however, is subject to attack and ultimate defeat from a basic security breach.

It would be advantageous to have a more secure system and method for managing the identity of users and of identifying users to third parties.

SUMMARY

In an example embodiment, a method is described. According to the method, logic on a remote device causes the capture of personal data identifying a user from an identification card. The remote device supports a user-accessible interface. The logic generates a hash value from the personal data using a hashing algorithm and signs the hash value with a digital signature created using a private key paired with a public key. Then the logic transmits, over a network, the signed hash value and the public key from the remote device to a distributed public database for storage. The logic then receives, over the network, a transaction number from the distributed public database and, transmits using the user-accessible interface, the transaction number and the personal data to a remote device of a third party for certification and/or verification.

In another example embodiment, another method is described. According to the method, logic on a first remote device causes the capture of personal data identifying a user from an identification card. The first remote device supports a user-accessible interface. The logic generates a hash value from the personal data using a hashing algorithm and signs the hash value with a digital signature created using a first private key paired with a first public key. Then the logic transmits, over a network, the signed hash value and the first public key from the remote device to a distributed public database for storage. The logic then receives, over the network, a first transaction number from the distributed public database.

The logic then transmits the first transaction number and the personal data to a second remote device, wherein logic on the second remote device (a) uses the first transaction number to retrieve the signed hash value and the first public key from the distributed public database, (b) hashes the personal data using the hashing algorithm to create a generated hash value, (c) verifies that the hash value in the signed hash value is the same as the generated hash value, (d) verifies that the signed hash value was signed with the first private key, and (e) creates a certification.

In another example embodiment, another method is described. According to the method, logic on a first smartphone causes the capture of personal data identifying a user from an identification card. The logic generates a hash value from the personal data using a hashing algorithm and signs the hash value with a digital signature created using a first private key paired with a first public key. Then the logic transmits, over a network, the signed hash value and the first public key from the remote device to a block chain database for storage. The logic then receives, over the network, a first transaction number from the block chain database.

The logic then transmits the first transaction number and the personal data to a second smartphone, wherein logic on the second smartphone (a) uses the first transaction number to retrieve the signed hash value and the first public key from the block chain database, (b) hashes the personal data using the hashing algorithm to create a generated hash value, (c) verifies that the hash value in the signed hash value is the same as the generated hash value, (d) verifies that the signed hash value was signed with the first private key, and (e) creates a certification.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

Corresponding reference characters indicate corresponding parts throughout the drawings.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1A:
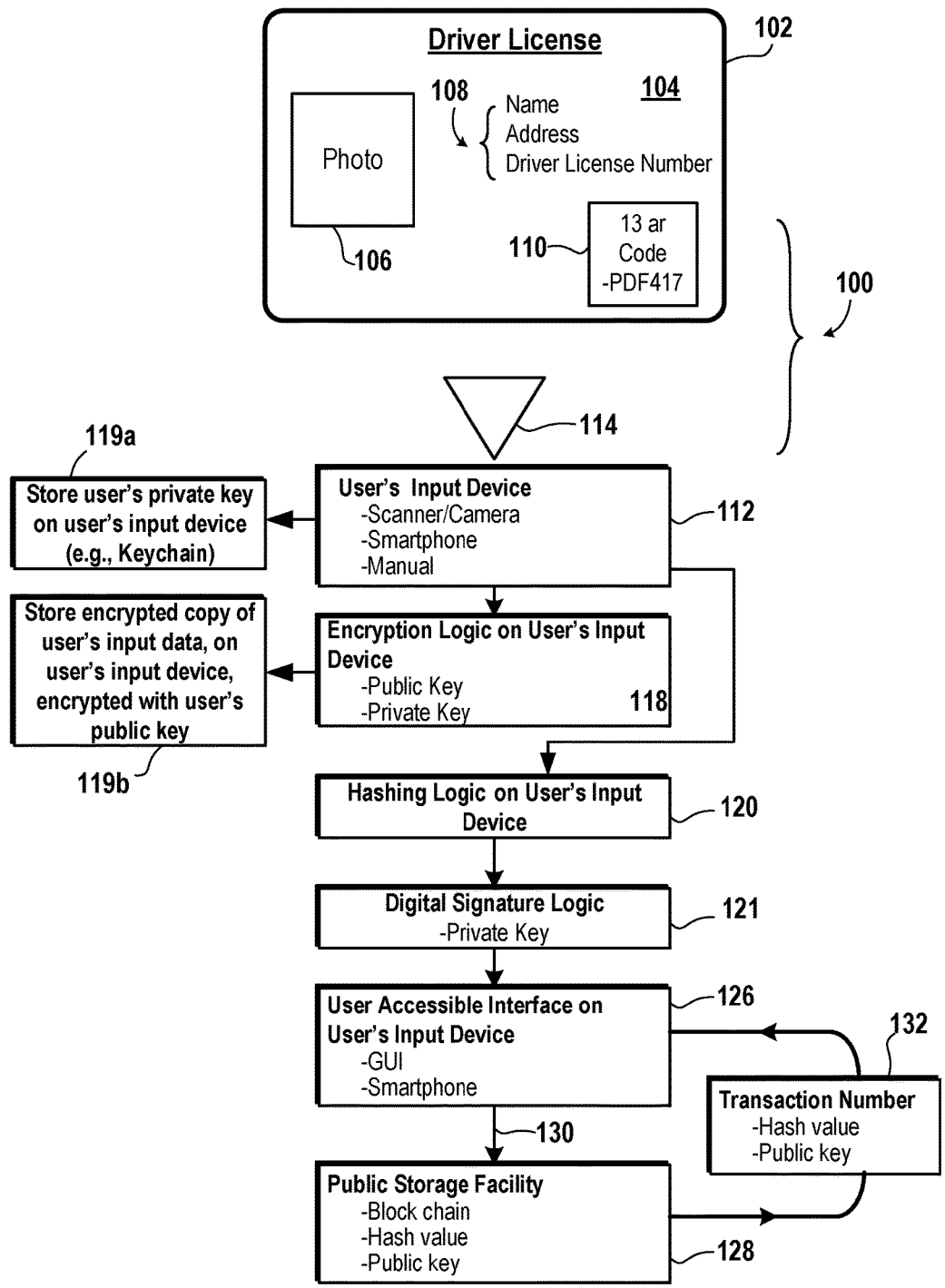
FIG. 1A shows a simplified block diagram of a system and method for sealing an identity of a person in a public storage facility.

FIG. 1A shows a simplified block diagram for a system 100 and method for managing the identity of a user by way of making verifiable transactions with a public storage facility 128. By way of example, an identification card 102 may be used. In other embodiments, other forms of identification, which may be digital or non-digital may be used. In the example of the identification card 102, personal data 104 is contained thereon, which identifies the user. The personal data can include a photo 106 of the user; the user's name, address and driver license number 108, and/or a bar code 110 or similar computer code for storing, scanning and/or retrieving additional data. Such coding can include PDF417 codes, QR codes, and other such codes. However, it is not necessary to have such code and the identification card may only have human-readable text strings. As noted above, the identification card 102 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 102 can be a government issued form of identification such as a driver license, passport, employee badge, military identification, political documentation, or the like. The identification card 102 can also be a privately issued form of identification such as a student ID, library card, social club card, or any other form of identification issued by a third party.

In one embodiment, as indicated by triangle 114, an input device 112 may be used to input such personal data from the identification card 102 to provide input data. Input device 112 can take many forms. For example, input device 112 can be a digital scanner, digital camera, or smartphone (e.g., with the camera commonly found in smartphones) for reading data from the identification card 102, including any codes appearing on the card 102. The input device 112 can also be a device for manually inputting personal data such as a keyboard, touchscreen, voice recognition device, handwriting recognition device, or other manual input device.

As shown in FIG. 1A, the input data can be optionally encrypted by encryption logic 118 and securely stored in operation 119b. In one implementation, the input data is transferred directly to hashing logic 120, without passing through encryption logic 118. For ease of understanding, the operations of the optional encryption logic 118 will be discussed first, and then the operations processed by the hashing logic 120. As such, the process may proceed directly from receiving the user information via 112 to the hashing logic 120.

The input data collected from the input device 112 (e.g., a user's smartphone) is passed to encryption logic 118 on input device 112. In an example embodiment, encryption logic 118 might include software, firmware, hardware, or any combination thereof, and consist of one or more encryption algorithms, e.g., an RSA encryption algorithm. Encryption logic 118 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. As shown in operation 119b, this encrypted data can then be stored locally on the input device 112 for added security. It can then only be accessed with the private key of the user on the input device 112, which might be stored in a more secure part of input device 112, e.g., "the Keychain", in operation 119a, if input device 112 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 112. It should be understood that the private key may be stored on another device, but similar or additional security should be processed to ensure that the private key is not compromised.

As noted above, the operations to be performed by the hashing logic 120 can proceed directly after receiving the input data from the input device 112. In this embodiment, the hashing logic 120 is used for hashing the input data (e.g., personal information collected) to provide or generate a hash value. The hash value is sometimes referred to as "hash data," that is generated by an algorithm. In an example embodiment, hashing logic 120 might be software, firmware, hardware, or any combination thereof, and consist of one or more hashing algorithms, e.g., a Secure Hash Algorithm (SHA) algorithm. Hashing logic 120 passes the hash value to digital-signature logic 121, which performs a digital signature on the hash value, using the private key on the input device 112. In an example embodiment, digital-signature logic 121 might be a component (or module) of encryption logic 118. In other embodiments, the digital-signature logic 121 may be defined by separate code, firmware, and/or hardware.

In one embodiment, the digital-signature logic 121 then passes the signed hash value and the public key to a user accessible interface 126 (e.g., a graphical user interface or GUI), which might be other software running on the input device 112. In an example embodiment, the user accessible interface 126 might be part of an application or app that includes encryption logic 118, hashing logic 120, and digital-signature logic 121, and/or other modules or code. The user accessible interface 126 might be used by the user to transmit the digitally signed hash value and the public key to a public storage facility 128 via a line 130, and receive back from the public storage facility 128 a transaction number 132 corresponding to the transmitted hash value and public key. As used in this disclosure, a "line" might be part of a wired and/or wireless connection or network, including a bus, an intranet, an internet, an extranet, a public computer network, a private computer network, etc., in an example embodiment. In an alternative example embodiment, only the signed hash value might be transmitted to public storage facility 128 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, must be kept secure, as noted above.

In one embodiment, the public storage facility 128 can take the form of a block chain (e.g., in a bitcoin online payment system) or any other public or private distributed database. The public storage facility 128 is connected to a communication link via a line and can be adapted to communicate over a public computer network, the internet, an intranet, an extranet, or any private communication network. Broadly speaking, the public storage facility 128 is accessible by any device that has an Internet connection over a network. A block chain, as is known in the art, is a system that enables users' access to securely store data in a public place. The data is deemed secure, as each time data is written, the written data is dependent on previously written data, which includes performing cryptographic hash operations. A benefit of using a block chain is that once data is written to the block chain and a block chain transaction is created, that transaction remains intact, and can be verified in the future. The reason for this, is that data is continually written to the block chain, e.g., after a particular transaction is made, and that later data is dependent on an earlier particular transaction. Consequently, by writing data to a public storage facility that implements a public block chain, later verification of that data is practically ensured to be correct. In one embodiment, a distributed public database is a block chain, which receives data for storage from a plurality of entities. The entities need not be related, and the type of data need not be the same. In general, entities storing the block chain are unrelated, and the type of data can vary to almost any type of digital data, e.g., not limited to identity data, commercial data, bitcoin data, etc. Thus, the data received for storage is configured to be processed to generate a transaction record that is dependent on previous data stored to the block chain. The transaction record being dependent on previous data stored to the block chain ensures that data stored to the block chain is not modifiable, as each later data stored to the block chain continues to be dependent on previous data stored to the block chain.

As indicated above, in an example embodiment, the input data might be hashed and the resulting hash value might be signed with a digital signature, created using a private key paired with a public key, before transmission, optionally along with the public key, from the input device (e.g., a user's smartphone) 112 to the public storage facility 128 for storage. The user accessible interface 126 is thus adapted to "seal" the signed hash value and the public key in the public storage facility 128. In one embodiment, once the hash value, and optionally the public key of the user is written to the block chain in a transaction, a later verification may be made if another party is able to hash the same input data.

Figure 1B:
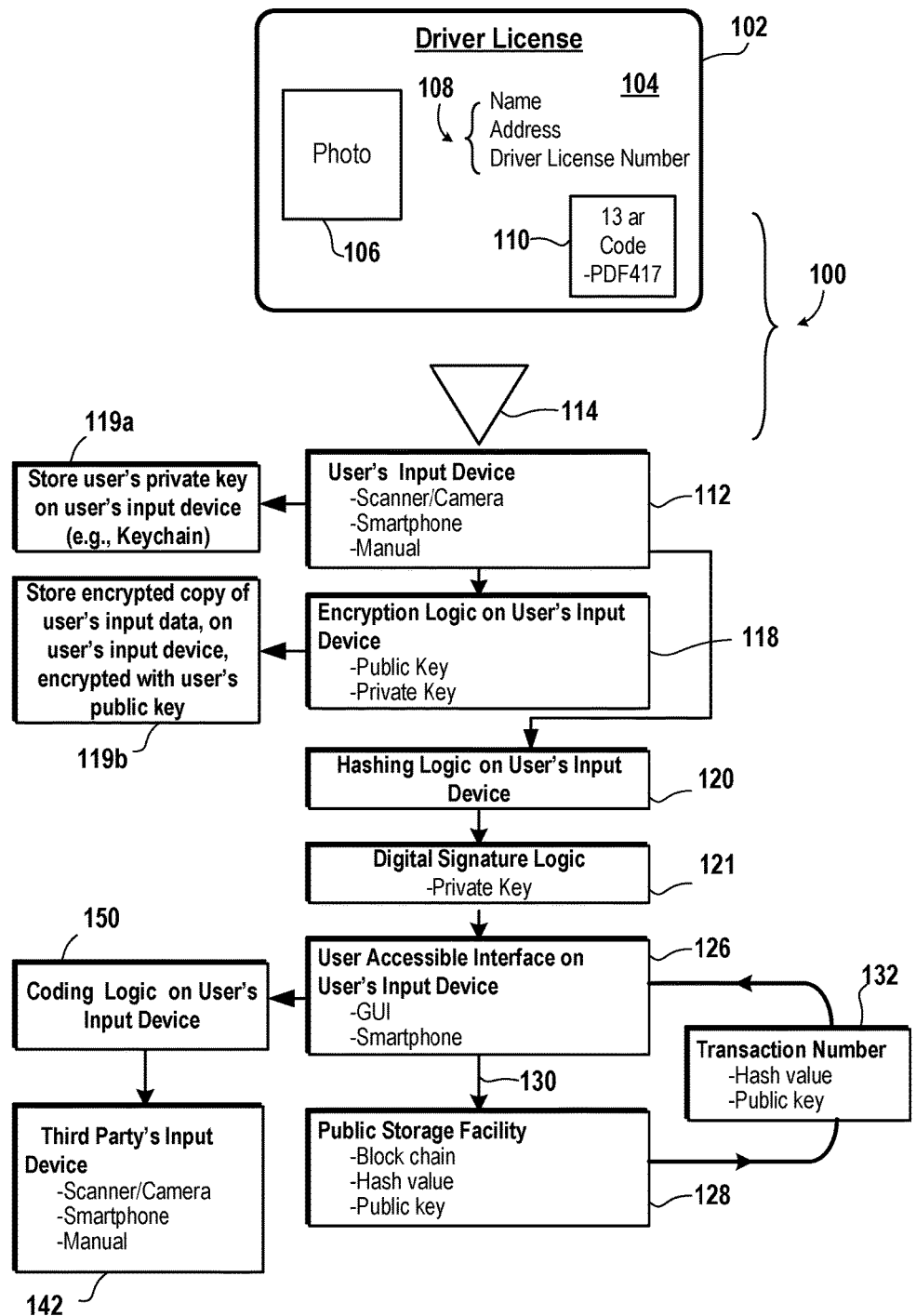
FIG. 1B also shows a simplified block diagram of a system and method for sealing an identity of a person in a public storage facility.

As depicted in FIG. 1B, user accessible interface 126 (e.g., a GUI) can be controllable by the user of the input device 112 to encrypt and provide the transaction number 132, the input data, and, optionally, the public key of the user, to an input device 142 (e.g., a smartphone) of a third party (e.g., a financial institution or other entity engaging in a commercial, private transaction, or other transaction with the user) to, for example, establish the identity of the user. In one embodiment, the third party will access the block chain using the transaction number 132 to retrieve the digitally signed hash value, and optionally, the public key if the public key has not been previously obtained by the third party from another source/location, and enable comparison with a hash value that is generated by the third party using the input data and the same hashing algorithm.

In an example embodiment, the encryption of the transaction number 132, the input data, and, optionally, the public key of the user might be performed by the encryption logic 118 using a public key of a third party paired with a private key of the third party. Then, coding logic 150 on the input device 112 might code the encrypted items into a barcode or QR code and the third party might use input device 142 to scan the barcode or QR code and decode it to gain access to the encrypted items. Thereafter, the third party might decrypt the encrypted items using the private key of the third party to perform a verification operation. In one embodiment, the verification may use an RSA algorithm as explained in further detail below. Other verification algorithms may also be used, depending on the configured implementation.

Figure 1C:
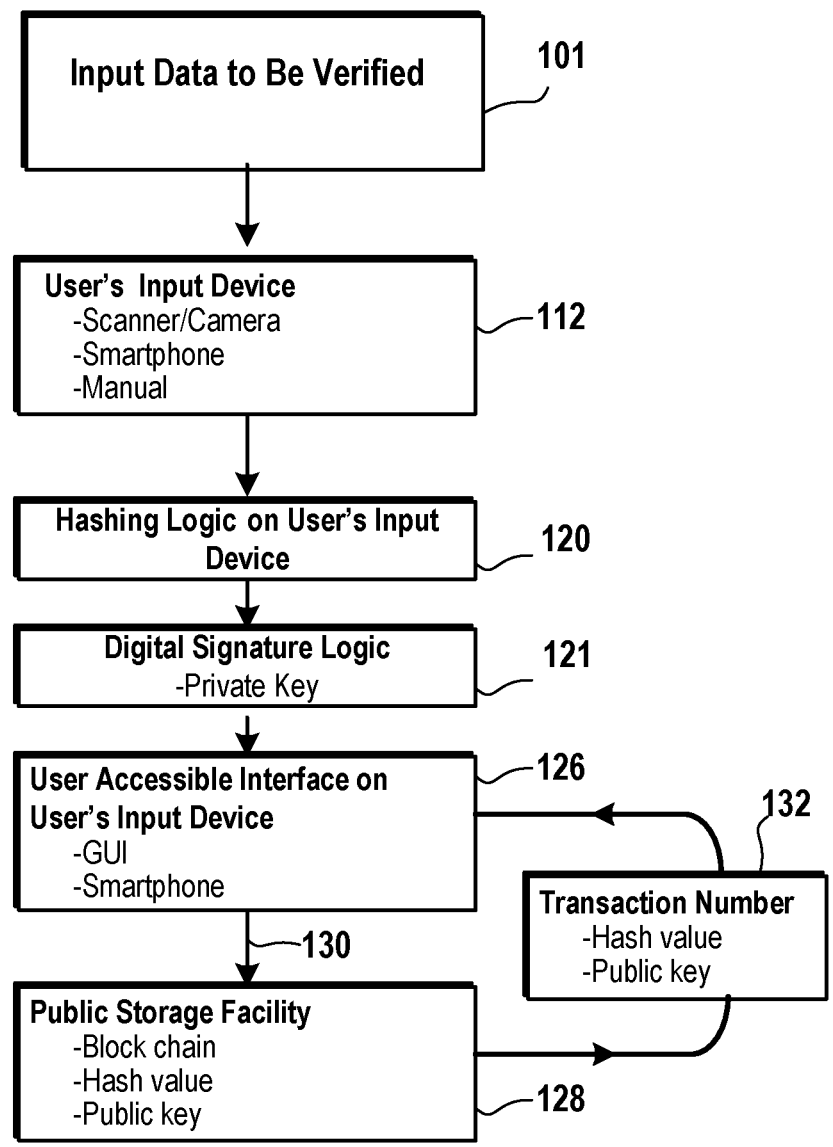
FIG. 1C shows a simplified block diagram of a system and method for sealing any input data in a public storage facility.

FIG. 1C shows a simplified block diagram of a system and method for sealing any input data in a public storage facility. As noted above, the operations to be performed by the hashing logic 120 can proceed directly after receiving the user information from the input device 112. In this embodiment, the hashing logic 120 is used for hashing the input data (e.g., personal information collected) to provide or generate a hash value. The hash value is sometimes referred to as "hash data," that is generated by an algorithm. In an example embodiment, hashing logic 120 might be software, firmware, hardware, or any combination thereof, and consist of one or more hashing algorithms, e.g., a Secure Hash Algorithm (SHA) algorithm. Hashing logic 120 passes the hash value to digital-signature logic 121, which performs a digital signature on the hash value, using the private key on the input device 112. In an example embodiment, digital-signature logic 121 might be a component (or module) of encryption logic 118. In other embodiments, the digital-signature logic 121 may be defined by separate code, firmware, and/or hardware.

In one embodiment, the digital-signature logic 121 then passes the signed hash value and the public key to a user accessible interface 126 (e.g., a graphical user interface or GUI), which might be other software running on the input device 112. In an example embodiment, the user accessible interface 126 might be part of an application or app that includes encryption logic 118, hashing logic 120, and digital-signature logic 121, and/or other modules or code. The user accessible interface 126 might be used by the user to transmit the digitally signed hash value and the public key to a public storage facility 128 via a line 130, and receives back from the public storage facility 128 a transaction number 132 corresponding to the transmitted hash value and public key. In an alternative example embodiment, only the signed hash value might be transmitted to public storage facility 128 by the user and persons retrieving the signed hash value might obtain the public key from elsewhere (e.g., the user, a public database, an Internet repository, a website, etc.). As is well known, there is no need to keep public keys secure, and in fact, the algorithms using public/private key pairs are design to enable full sharing of public keys. The private key, on the other hand, must be kept secure, as noted above.

In one embodiment, the public storage facility 128 can take the form of a block chain (e.g., in a bitcoin online payment system) or any other public or private distributed database. The public storage facility 128 is connected to a communication link via a line and can be adapted to communicate over a public computer network, the internet, an intranet, an extranet, or any private communication network. Broadly speaking, the public storage facility 128 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 112 to the public storage facility 128 for storage. The user accessible interface 126 is thus adapted to "seal" the signed hash value and the public key in the public storage facility 128. In one embodiment, once the hash value, and, optionally, the public key of the user is written to the block chain in a transaction, a later verification may be made if another party is able to hash the same input data.

Figure 2A:
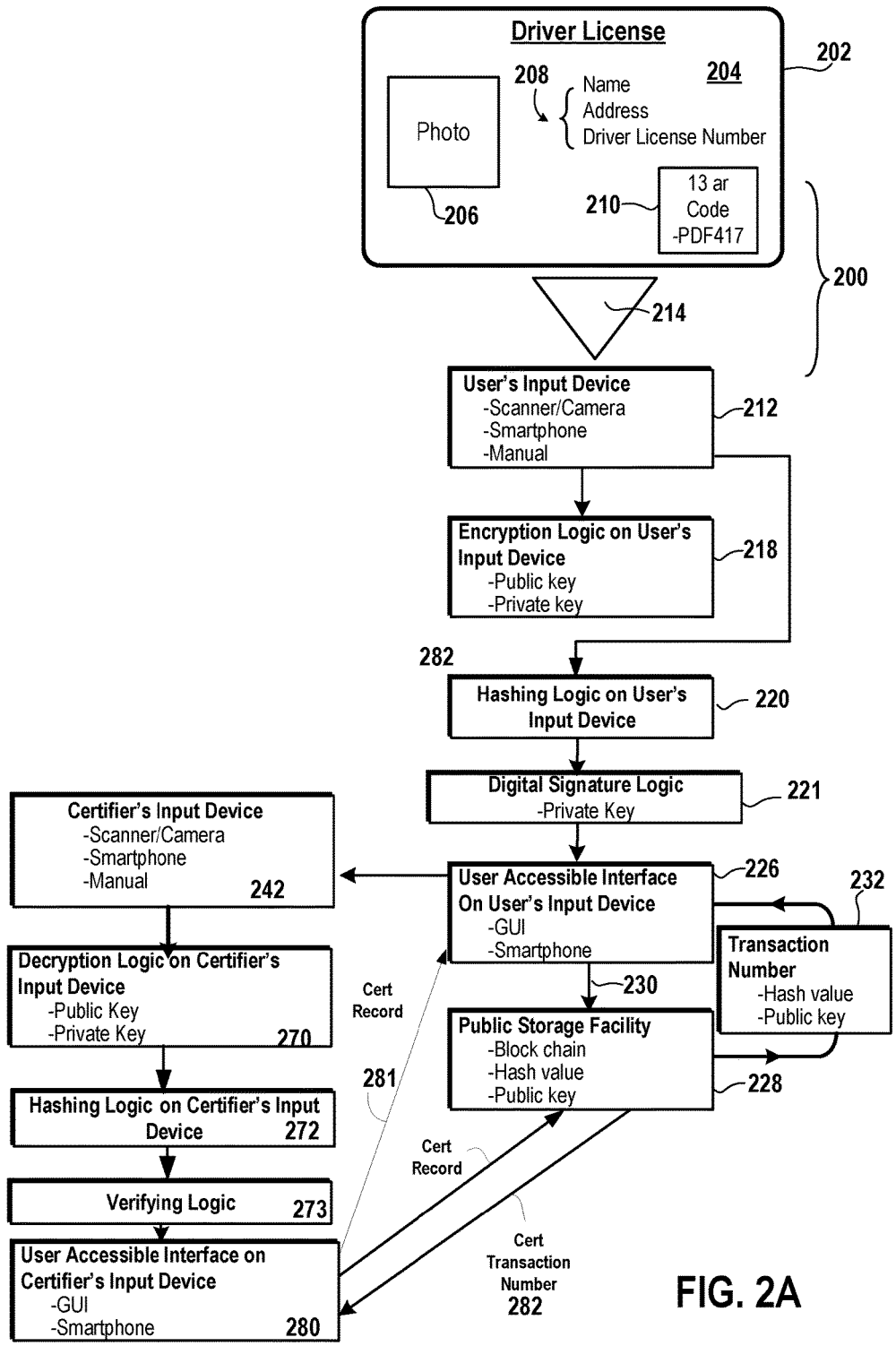
FIG. 2A shows a simplified block diagram of a system and method for certifying an identity of a person.

FIG. 2A shows a simplified block diagram for a certification method for managing the identity of a user in a public storage facility 228. By way of example, an identification card 202 may be used. In other embodiments, other forms of identification, which may be digital or non-digital may be used. In the example of the identification card 202, personal data 204 is contained thereon, which identifies the user. The input data can include a photo 206 of the user; the user's name, address and driver license number 208, and/or a bar code 210 or similar computer code for storing, scanning and/or retrieving additional data. Such coding can include PDF417 codes, QR codes, and other such codes. However, it is not necessary to have such code and the identification card may only have human-readable text strings. As noted above, the identification card 202 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 202 can be a government issued form of identification such as a driver license, passport, employee badge, military identification, political documentation, or the like. The identification card 202 can also be a privately issued form of identification such as a student ID, library card, social club card, or any other form of identification issued by a third party.

In one embodiment, as indicated by triangle 214, an input device 212 may be used to input such personal data from the identification card 202 to provide input data. Input device 212 can take many forms. For example, input device 212 can be a digital scanner, digital camera, or smartphone (e.g., with the camera commonly found in smartphones) for reading data from the identification card 202, including any codes appearing on the card 202. The input device 212 can also be a device for manually inputting personal data such as a keyboard, touchscreen, voice recognition device, handwriting recognition device, or other manual input device.

As shown in FIG. 2A, the input data can be optionally encrypted by encryption logic 218 and securely stored. In one implementation, the input data is transferred directly to hashing logic 220, without passing through encryption logic 218. For ease of understanding, the operations of the optional encryption logic 218 will be discussed first, and then the operations processed by the hashing logic 220. As such, the process may proceed directly from receiving the user information via 212 to the hashing logic 220.

The input data collected from the input device 212 (e.g., a user's smartphone) is passed to encryption logic 218 on input device 212. In an example embodiment, encryption logic 218 might include software, firmware, hardware, or any combination thereof, and consist of one or more encryption algorithms, e.g., an RSA encryption algorithm. Encryption logic 218 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 212 for added security. It can then only be accessed with the private key of the user on the input device 212, which might be stored in a more secure part of input device 212, e.g., "the Keychain", if input device 212 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 212. It should be understood that the private key may be stored on another device, but similar or additional security should be processed to ensure that the private key is not compromised.

As noted above, the operations to be performed by the hashing logic 220 can proceed directly after receiving the input data from the input device 212. In this embodiment, the hashing logic 220 is used for hashing the input data (or selected fields of the input data or personal data) to provide or generate a hash value. The hash value is sometimes referred to as "hash data," that is generated by an algorithm. In an example embodiment, hashing logic 220 might be software, firmware, hardware, or any combination thereof, and consist of one or more hashing algorithms, e.g., a Secure Hash Algorithm (SHA) algorithm. Hashing logic 220 passes the hash value to digital-signature logic 221, which performs a digital signature on the hash value, using the private key on the input device 212. In an example embodiment, digital-signature logic 221 might be a component (or module) of encryption logic 218. In other embodiments, the digital-signature logic 221 may be defined by separate code, firmware, and/or hardware.

In one embodiment, the digital-signature logic 221 then passes the signed hash value and the public key to a user accessible interface 226 (e.g., a graphical user interface or GUI), which might be other software running on the input device 212. In an example embodiment, the user accessible interface 226 might be part of an application or app that includes encryption logic 218, hashing logic 220, and digital-signature logic 221, and/or other modules or code. The user accessible interface 226 might be used by the user to transmit the digitally signed hash value and, optionally, the public key to a public storage facility 228 via a line 230, and receive back from the public storage facility 228 a transaction number 232 corresponding to the transmitted hash value and public key.

In one embodiment, the public storage facility 228 can take the form of a block chain (e.g., in a bitcoin online payment system) or any other public or private distributed database. The public storage facility 228 is connected to a communication link via a line and can be adapted to communicate over a public computer network, the internet, an intranet, an extranet, or any private communication network. Broadly speaking, the public storage facility 228 is accessible by any device that has an Internet connection over a network.

As indicated above, in an example embodiment, the input data (or selected fields of the input data) might be hashed and the resulting hash value might be signed with a digital signature, created using a private key paired with a public key, before transmission, along with, optionally, the public key, from the input device (e.g., a user's smartphone) 212 to the public storage facility 228 for storage. The user accessible interface 226 is thus adapted to "seal" the signed hash value and the public key in the public storage facility 228. In one embodiment, once the hash value, and, optionally, the public key of the user is written to the block chain in a transaction, a later verification may be made if another party is able to hash the same input data.

The user accessible interface 226 (e.g., a GUI) can be controllable by the user of the input device 212 to encrypt and provide the transaction number 232, the input data (or selected fields of the input data), and, optionally, the public key to an input device 242 (e.g., a smartphone) of a certifier. In an example embodiment, the encryption might be performed by the encryption logic 218 using a public key of a certifier paired with a private key of the certifier. Then, coding logic on the input device 212 might code the encrypted transaction number 232, the input data (or selected fields of the input data), and, optionally, the public key into a barcode or QR code and the certifier might use input device 242 to scan the barcode or QR code and decode it to gain access to the encrypted items. Thereafter, the certifier might decrypt the encrypted items using the private key of the certifier and verify them, e.g., using a "verify" function call to an RSA algorithm as explained in further detail below.

Once the certifier's input device 242 receives the barcode or QR code, decoding logic on the certifier's input device 212 might decode the barcode or QR code and decryption logic 270 on the certifier's input device 242 might use the certifier's private key to decrypt the encrypted items. In an example embodiment, decryption logic 270 might be a component (or module) of more general encryption logic. In one embodiment, the decrypted input data (or selected fields of the input data) might be hashed into a hash value by hashing logic 272 on the certifier's input device 242, using the same hashing algorithm that was used to create the hash value that was digitally signed by the user. And the decrypted transaction number 232 might be used by a user accessible interface 280 (e.g., a GUI) to access the public storage facility 228 (e.g., the block chain) and retrieve the signed hash value and public key of the user. The retrieved signed hash value, the generated hash value, and the retrieved or obtained public key might then be input to verifying logic 273 for verification (e.g., through a "verify" function call to an RSA algorithm), which outputs a "true" value if the two hash values are the same and the public key is associated with the signature or a "false" value if the two hash values are not the same or the public key is not associated with the signature. In an example embodiment, verifying logic 273 might be a component (or module) of decryption logic 270. In another embodiment, the verifying logic 273 may be a separate module, software, firmware and/or hardware. As indicated above, in an example embodiment, the public key of the user might be obtained from some other source than the public storage facility 228 (e.g., from the user), in an example embodiment.

Figures 1, 2B:
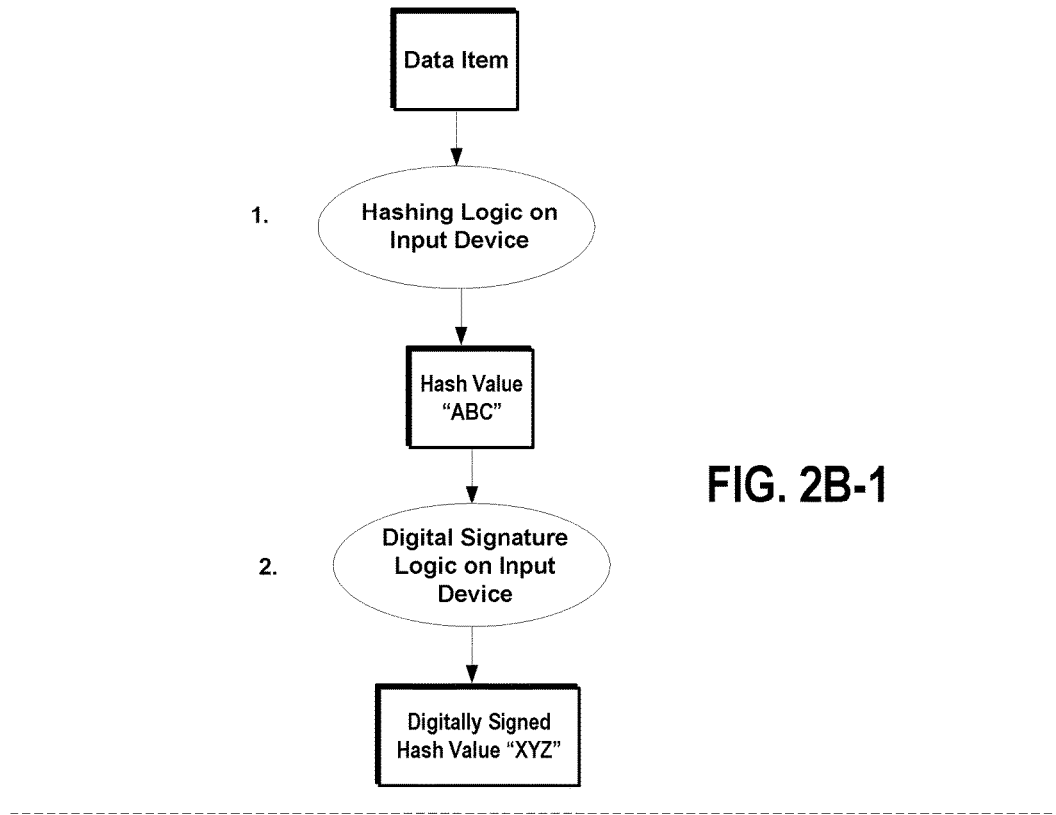
FIGS. 2B-1 and 2B-2 show a process for verifying hashed input data and a digital signature.
Figures 2, 2B:
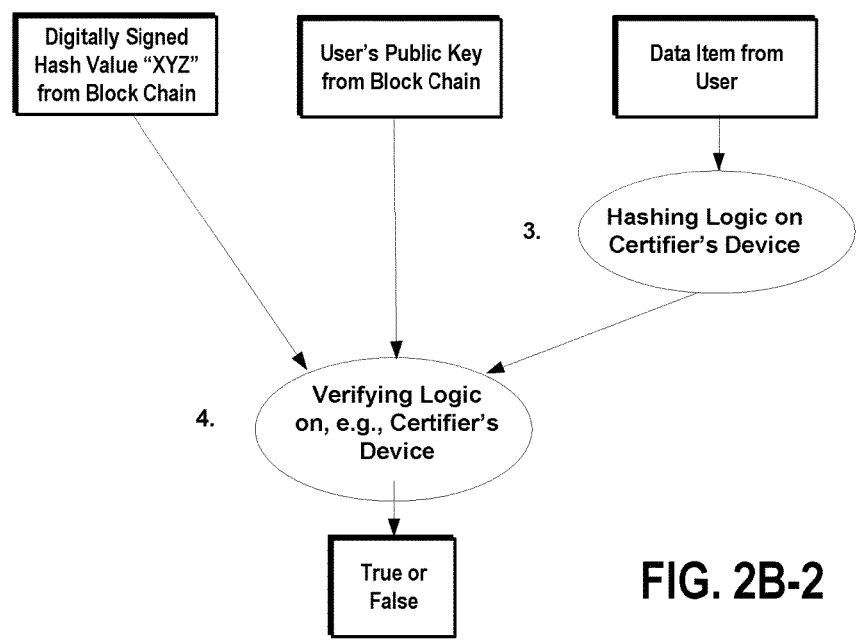

This verification process is depicted in FIGS. 2B-1 and 2B-2. FIG. 2B-1 shows how a digitally signed hash value is created from input data. The input data (or selected fields of the input data) is hashed into a hash value "ABC" by hashing logic 220 on the user's input device 112, in operation 1. Then the hash value "ABC" is digitally signed with the user's private key using digital-signature logic 121 to create digitally signed hash value "XYZ", in operation 2.

FIG. 2B-2 shows how a digitally signed hash value is verified after being retrieved along with the public key of the user from the public storage facility 228. The input data (or selected fields of the input data) is received from the user's input device 212 at the certifier's input device 242 and is hashed into a generated hash value "ABC" using hashing logic 272, in operation 3. Then the signed hash value "XYZ", the generated hash value "ABC", and the user's public key are input to verification logic 273 in operation 4. The verification logic 273 might include a RSA verification algorithm, in an example embodiment. If the hash value in the digitally signed hash value "XYZ" is the same as the generated hash value "ABC" and the digital signature was signed with a private key that is associated with the user's public key, the verification logic 273 returns a value of "true". Otherwise the verification logic 273 returns a value of "false". It should be understood that the verification logic 273 may be executed on any device (e.g., a user's device, a certifier's device, a verifier's device, a third party's device, a commercial entity's device, a private entity's device, etc.), that needs to perform a verification operation.

Upon receipt of a "true" value from encryption logic 270, the certifier might create a certification record that refers to the verification. In an example embodiment, the certification record might include the transaction number 232, the input data (or selected fields of the input data), received from the user, and, optionally, a timestamp, and the certification record might be hashed and digitally signed by the certifier using a private key of the certifier associated with a public key. Then the certifier might use user accessible interface 280 (e.g., a GUI) to transmit the signed certification record to the public storage facility 228 for storage and receive in return transaction number 282 from the public storage facility 228. In an example embodiment, the certifier might encrypt the certification record with the certifier's public key before transmission to the public storage facility 228, in order to keep the certification record private.

It will be appreciated that the verification process shown in FIGS. 2B-1 and 2B-2 might be used to verify the digital signature on items of data other than the input data (or selected fields of the input data) received by input device 212. In an example embodiment, the item of data that is digitally signed might not be hashed before being digitally signed. In an example embodiment, the verification process shown in FIGS. 2B-1 and 2B-2 might be used to verify a digitally-signed hash of a document other than an identification card, e.g., a digitally-signed certification as described above or a digitally-signed acknowledgement as described below. Or, the same verification process might be used to verify a digitally-signed token (e.g., random number) that is sent by a sender using a secure-envelope process. A secure-envelope process, as described below, might be used instead of, or in addition to, public-key encryption when transmitting data from a user to a certifier, verifier, third party, etc., and vice versa.

In an example embodiment, when using a secure envelope process, a sender might hash a real-time token (e.g., a random number generated by the user's remote device) and digitally sign the hashed token using the sender's private key. In an example embodiment, a timestamp might be optionally included with the token. Then the sender might transmit the signed hashed token and, optionally, the public key associated with the sender's private key to a distributed public database for storage, receiving a transaction number in return from the distributed public database. Thereafter, the sender might transmit the transaction number and the token to a receiver, e.g., a certifier, a verifier, a third party, etc., optionally, after encrypting the transaction number and the token with the receiver's public key. In an example embodiment, the receiver might receive the transaction number and token (optionally including the timestamp), decrypt them using the receiver's private key, if necessary, and then use the transaction number to retrieve the digitally signed hashed and, optionally, the sender's public key from the distributed public database. The receiver might generate a hash of the token using the same hashing algorithm the sender used. Then the receiver might verify, e.g., using an RSA verify call as described above, that the token in the generated hash is the same as the token in the digitally signed hash token and verify that the digital signature was created with the sender's private key. An RSA verify call may be, for example, processed by verifying logic 273, e.g., to execute a verify operation. In an example embodiment, the token (optionally including the timestamp) might not be hashed before being signed.

Figure 2C:
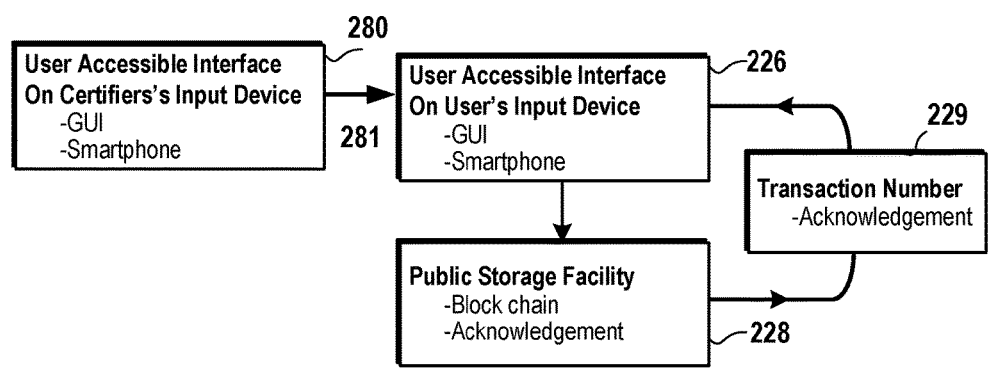
FIG. 2C shows a simplified block diagram for recording an acknowledgement.

In one configuration, as depicted in FIG. 2C, the certifier might encrypt the certification record and transaction number 282 (e.g., the transaction number the certifier received from the public storage facility 228) with the user's public key and transmit in 281 the encrypted certification record to the user, using user accessible interface 280 (e.g., a GUI). Upon receiving the encrypted certification record, the user might decrypt it using the user's private key and then create an acknowledgement record that refers to or includes the certification record, and optionally includes a timestamp, in order to link the two records in the public storage facility 228 to facilitate convenient lookup by a third party, if the certification record is verified. Here again, to verify the certification record, the user might hash the certification record using the same hashing algorithm that the certifier used prior to digital signature by the certifier. The user might use transaction number 282 to retrieve the signed certification record and the certifier's public key from the public storage facility 228. Then the user might verify that the certification record in the generated hash is the same as the certification record in the digitally signed certification record and verify that the digital signature was created with the certifier's private key, e.g., using an RSA verify call as described above.

In an example embodiment, the acknowledgement record might include the certification record, the transaction number 282, and optionally, a timestamp, and the user might digitally sign the acknowledgement record with the user's private key. Then the user might use user accessible interface 228 (e.g., a GUI) to transmit the signed acknowledgement record and the user's public key to the public storage facility 228 for storage and receive a transaction number 229 in response from the public storage facility 228. In an example embodiment, the user might encrypt the signed acknowledgement record with the user's public key before transmission to the public storage facility 228 in order to keep the acknowledgement record private.

Figure 3A:
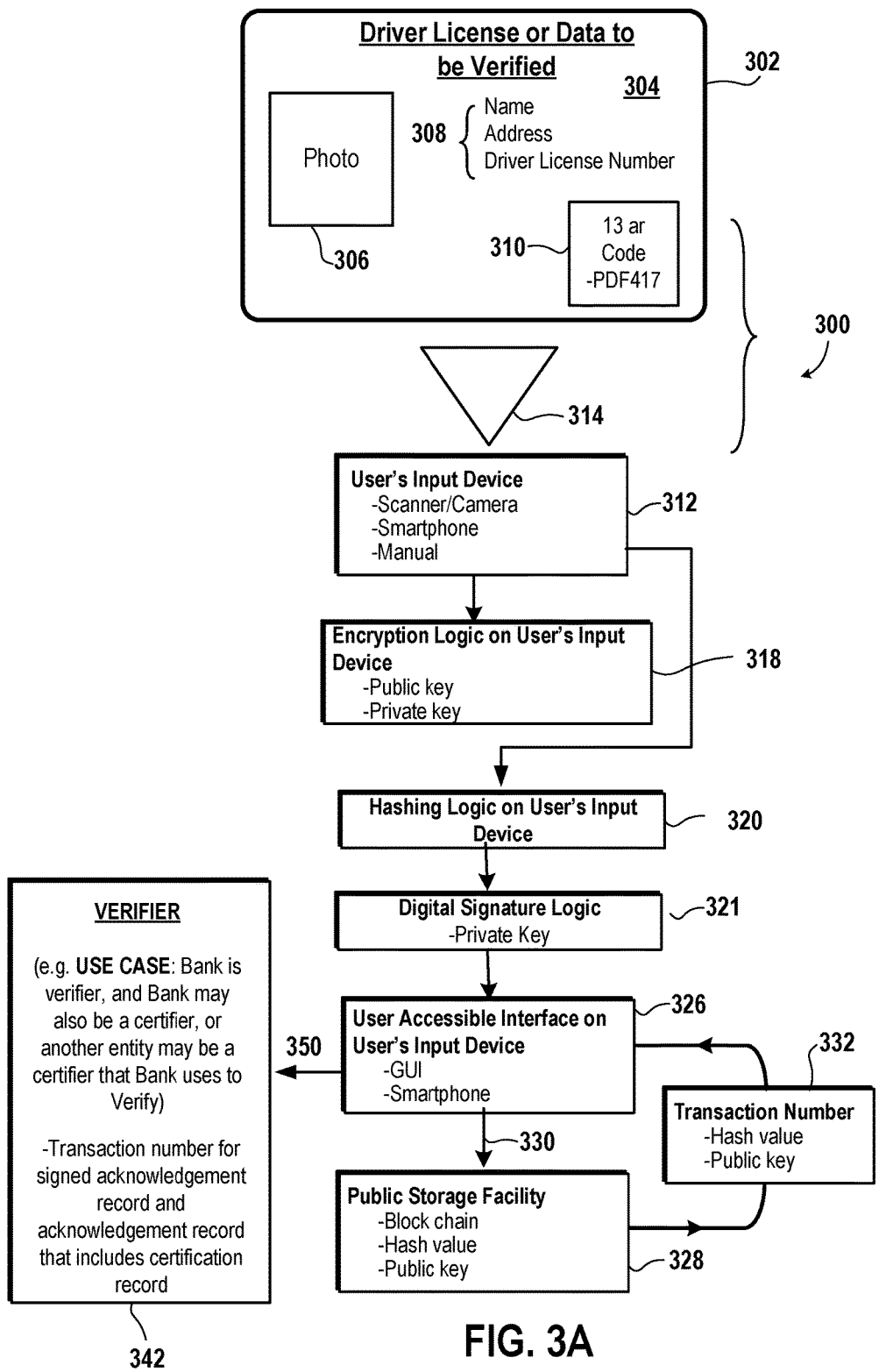
FIG. 3A shows a simplified block diagram of a system and method for verifying an acknowledgement record.

FIG. 3A shows a simplified block diagram for a system and method for certifying a pending transaction. By way of example, an identification card 302 may be used. In other embodiments, other forms of identification, which may be digital or non-digital may be used. In the example of the identification card 302, personal data 304 is contained thereon, which identifies the user. The personal data can include a photo 306 of the user; the user's name, address and driver license number 308, and/or a bar code 310 or similar computer code for storing, scanning and/or retrieving additional data. Such coding can include PDF417 codes, QR codes, and other such codes. However, it is not necessary to have such code and the identification card may only have human-readable text strings. As noted above, the identification card 302 may also take a physical or a digital form and the information can be retrieved either through scanning a code as described, performing Optical Character Recognition (OCR) on text strings, digitally transferring a digital identification card from one system to another, manually inputting the information using a keyboard, manually inputting the information using voice recognition, etc., in example embodiments.

The identification card 302 can be a government issued form of identification such as a driver license, passport, employee badge, military identification, political documentation, or the like. The identification card 302 can also be a privately issued form of identification such as a student ID, library card, social club card, or any other form of identification issued by a third party.

In one embodiment, as indicated by triangle 314, an input device 312 may be used to input such personal data from the identification card 302 to provide input data. Input device 312 can take many forms. For example, input device 312 can be a digital scanner, digital camera, or smartphone (e.g., with the camera commonly found in smartphones) for reading data from the identification card 302, including any codes appearing on the card 302. The input device 312 can also be a device for manually inputting personal data such as a keyboard, touchscreen, voice recognition device, handwriting recognition device, or other manual input device.

As shown in FIG. 3A, the input data can be optionally encrypted by encryption logic 318 and securely stored. In one implementation, the input data is transferred directly to hashing logic 320, without passing through encryption logic 318. For ease of understanding, the operations of the optional encryption logic 318 will be discussed first, and then the operations processed by the hashing logic 320. As such, the process may proceed directly from receiving the user information via 312 to the hashing logic 320.

The input data collected from the input device 312 (e.g., a user's smartphone) is passed to encryption logic 318 on input device 312. In an example embodiment, encryption logic 318 might include software, firmware, hardware, or any combination thereof, and consist of one or more encryption algorithms, e.g., an RSA encryption algorithm. Encryption logic 318 encrypts the input data with a public key to provide encrypted data. The public key is paired with an associated private key as is conventional when generating such keys using an RSA encryption algorithm, an Elliptic Curve Digital Signature Algorithm (ECDSA), or other encryption algorithm known to those skilled in the art. This encrypted data can then be stored locally on the input device 312 for added security. It can then only be accessed with the private key of the user on the input device 312, which might be stored in a more secure part of input device 312, e.g., "the Keychain", if input device 312 is an iOS (e.g., operating system used by devices made by Apple, Inc.) smartphone. If the device is of a different type, e.g., one using an Android OS (e.g., operating system by Google, Inc.), similar secure device storage methods may be used. In this manner, for added security, the private key is not compromised and is kept safely on the input device 312. It should be understood that the private key may be stored on another device, but similar or additional security should be processed to ensure that the private key is not compromised.

As noted above, the operations to be performed by the hashing logic 320 can proceed directly after receiving the user information from the input device 312. In this embodiment, the hashing logic 320 is used for hashing the input data (or selected fields of the input data or personal data) to provide or generate a hash value. The hash value is sometimes referred to as "hash data," that is generated by an algorithm. In an example embodiment, hashing logic 320 might be software, firmware, hardware, or any combination thereof, and consist of one or more hashing algorithms, e.g., a Secure Hash Algorithm (SHA) algorithm. Hashing logic 320 passes the hash value to digital-signature logic 321, which performs a digital signature on the hash value, using the private key on the input device 312. In an example embodiment, digital-signature logic 321 might be a component (or module) of encryption logic 318. In other embodiments, the digital-signature logic 321 may be defined by separate code, firmware, and/or hardware.

In one embodiment, the digital-signature logic 321 then passes the signed hash value and, optionally, the public key to a user accessible interface 326 (e.g., a graphical user interface or GUI), which might be other software running on the input device 312. In an example embodiment, the user accessible interface 326 might be part of an application or app that includes encryption logic 318, hashing logic 320, and digital-signature logic 321, and/or other modules or code. The user accessible interface 326 might be used by the user to transmit the digitally signed hash value and, optionally, the public key to a public storage facility 328 via a line 330, and receive back from the public storage facility 328 a transaction number 332 corresponding to the transmitted hash value and public key.

In one embodiment, the public storage facility 328 can take the form of a block chain (e.g., in a bitcoin online payment system) or any other public or private distributed database. The public storage facility 328 is connected to a communication link via a line and can be adapted to communicate over a public computer network, the internet, an intranet, an extranet, or any private communication network. Broadly speaking, the public storage facility 328 is accessible by any device that has an Internet connection over a network.

As indicated above, in an example embodiment, the input data might be hashed and the resulting hash value might be signed with a digital signature, created using a private key paired with a public key, before transmission, optionally along with the public key, from the input device (e.g., a user's smartphone) 312 to the public storage facility 328 for storage. The user accessible interface 326 is thus adapted to "seal" the signed hash value and the public key in the public storage facility 328. In one embodiment, once the hash value, and, optionally, the public key of the user is written to the block chain in a transaction, a later verification may be made if another party is able to hash the same input data.

The user accessible interface 326 (e.g., a GUI) can be controllable by the user of the input device 312 to transmit, in 350, an acknowledgement record, a transaction number for a signed acknowledgement record, and optionally the user's public key to a verifier 342. In an example embodiment, transaction number 332 for the signed input data and the input data might also be transmitted to verifier 342, for verification using the verification process used by the certifier, as described above. As used herein, to provide broad understanding of the functions or operation of verifier 342, an example use case of a bank, being the verifier is provided. It should be understood that the verifier can be any entity that needs to verify identity, data, or transaction(s). Additionally, the certifier may be any entity that has certified identity, data, or transaction(s). Thus, in this use case example, the bank is not necessarily the same entity as the certifier, but in other circumstances, the bank may also be the certifier. By way of example, the bank may verify a certification made by another entity, e.g., a credit card company, a car company, a government agency, a private entity, etc. Acknowledgement records and transaction numbers for signed acknowledgement records were discussed in detail above with respect to FIG. 2C. As noted indicated above, the user might use encryption with the verifier's public key and/or a secure-envelope process for transmission 350.

Figure 3B:
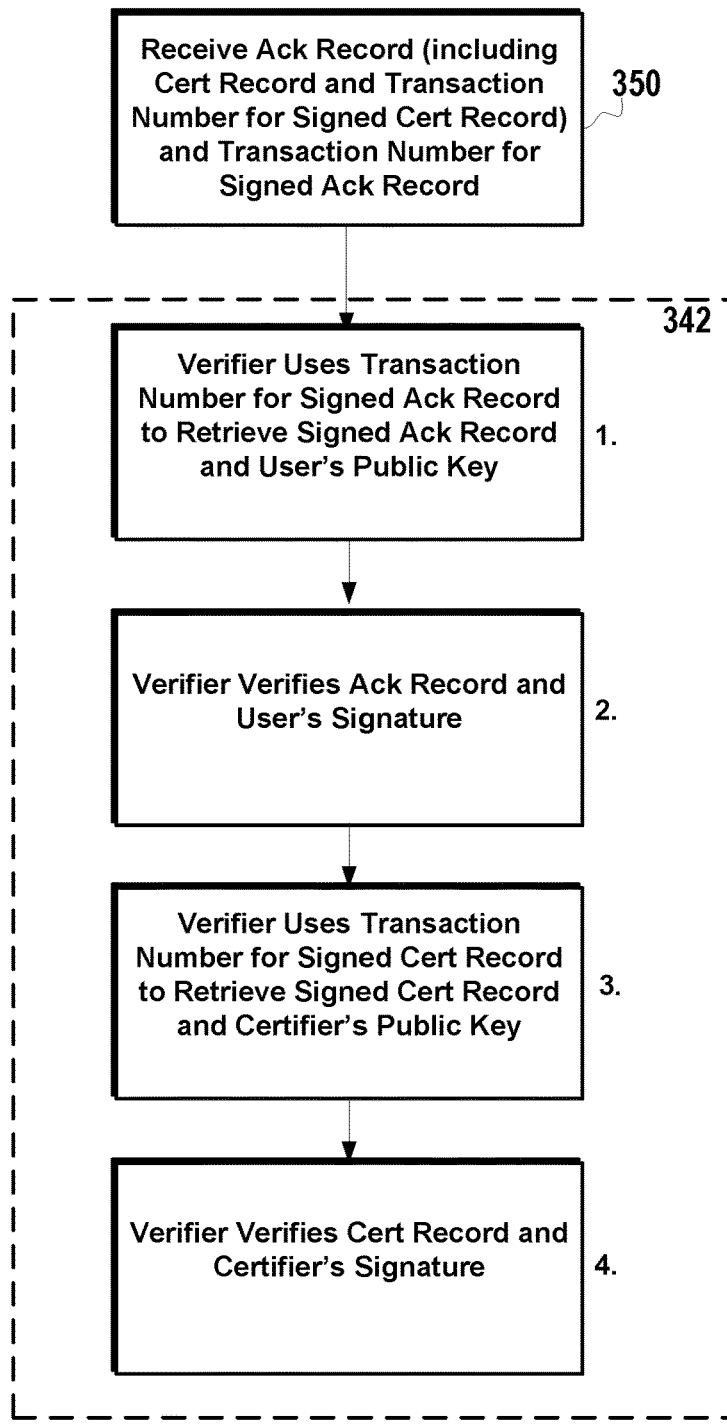
FIG. 3B shows a flowchart diagram for a method for verifying an acknowledgement record and its underlying certification record.

Once the verifier receives the acknowledgement record and the transaction number for the signed acknowledgement record, the verifier might use the process shown in FIG. 3B to verify the acknowledgement record and its underlying certification record. In operation 1, the verifier uses the transaction number to retrieve the signed acknowledgement record and, optionally, the user's public key from public storage facility 328. Then, in operation 2, the verifier hashes the acknowledgement record with the same hashing algorithm that was used by the user and verifies the acknowledgement record and the user's signature, using a verification algorithm as discussed in detail above. If the verification is successful, the verifier uses the transaction number for the signed certification record to retrieve the signed certification record and the certifier's public key from public storage facility 328, in operation 3. Then, in operation 4, the verifier hashes the certification record with the same hashing algorithm that was used by the certifier and verifies the certification record and the certifier's signature, using a verification algorithm as discussed in detail above. If this verification is also successful, the verifier might create another certification record as discussed above and transmit it to public storage facility 328, receiving, in response, another transaction number, which might be transmitted along with the verifier's certification record to the user for another acknowledgement record.

In the event the certification record and/or the acknowledgement record are optionally encrypted before transmission to the block chain, the user transmits an unencrypted acknowledgment record to the verifier and the verifier performs its verifications using the data in the unencrypted acknowledgement record. In an example embodiment, these verifications include checking that an acknowledgment record in fact exists in the block chain with the transaction number for the signed acknowledgement record. Also, in an example embodiment, the unencrypted acknowledgment record includes the transaction number of the signed certification record along with other unencrypted data from the certification record. Using the transaction number for the signed certification and the unencrypted data from the certification record, the verifier can confirm that the certification record in fact exists on the block chain and can process the unencrypted data in the certification record to verify the certifier's signature, even if the certification record was also encrypted before transmission to the block chain.

It should be understood that the embodiments and described use cases herein are only by way of example. Many new use cases can be encompassed and facilitated by the functionality described herein. For instance, identity verification can be integrated into various commercial applications, as well as private applications. Commercial applications may include those that require commercial entities to verify a user's identity. Verifying a user's identity can be required for achieving any number of functions, such as traveling, making transactions, banking, communication, loan verification, credit verification, purchase verification, and other uses. Private identity verification can also be facilitated using the methods, apparatus, computer readable media, and systems described herein. Private identity verification may be useful when a user wishes to prove to another user their identity, in a fast and efficient manner. The systems described herein, as described above, utilize methods that write data to the block chain database, which is non-rewritable and permanently maintains the record without compromise. This enables writing of information to the block chain in a manner that can be verified by one or more transactions executed by methods of the present inventions.

Additionally, the method operations described herein may be executed with any number of computer systems. By way of example, the computer systems may include user devices, such as mobile phones, tablets, desktop computers, watch computers, head attached computers, eyeglasses computers, or combinations thereof. Server operations may also be performed and communicated between client devices, to facilitate transactions with the block chain database, server storage, and the like. By way of example, these computer devices can communicate over networks, such as the Internet. The networks enable individual devices to transact with each other, such as by way of sending, receiving, and processing exchanged information. The exchanged information can include different types of encrypted data, hashed data, envelopes, codes, QR codes, messages, notifications, and other types of data.

The messaging and communication functions are provided to enable users to exchange data in order to verify identity, or enable or provide access to users to services, goods, or commercial transactions. In the case of banking operations, the verification process can be utilized by banks, as well as users of the bank or third parties that require certified information from the banks regarding users. In the case of travel type verifications, different travel entities can require identification of users, and that the identification be verified by themselves or by other third parties that are trusted. These operations can be facilitated using the systems, methods, computer readable media, and code that execute the verification processes. Broadly speaking, verification of a user identity can be useful in any type of industry, or private setting. The use of verification is simply facilitated by using the verifying infrastructure, programs code, applications, and combinations thereof, to ensure that verification is secure.

In some embodiments, the verification systems can be embodied in an application, such as those that can be installed on mobile devices (e.g., Apps). By way of example, users wishing to have their identity verified can use an App to seal information regarding their identity. Once the data has been sealed, and encrypted data has been stored to the block chain, this data can be used for later certification by another party. The other party may also be utilizing a corresponding App, which enables efficient reading of the data, code, QR code, message, or notification, to validate the identity of the user.

In still other embodiments, code plug-ins can be integrated into commercial websites, which may use identity verification for different reasons or functions. For example, banks can install plug-in applications, code, or programs that can execute part or all of the verification processing to seal information and/or to certify information regarding identity. In view of the foregoing, it should be understood that the verifying processes described herein and the various use cases are only by way of example, and additional use cases will be evident to those skilled in the art.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Having provided this detailed description, it will be apparent that modifications and variations are possible without departing from the scope of the invention defined in the appended claims. When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. In view of the above, it will be seen that the several objects of the invention are achieved and other advantageous results attained. As various changes could be made in the above systems without departing from the scope of the invention, it is intended that all matter contained in the above description and shown in the accompanying drawings shall be interpreted as illustrative and not in a limiting sense.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the website might host an online retailer or an online publication, instead of a connected-television service. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method for managing an identity of a user as executed by a first processor of a first smartphone and a second processor of a second smartphone, the method comprising operations of:
    receiving by the first processor personal data identifying the user from an identification card, wherein the personal data is received on the first smartphone;
    creating by the first processor a hash value from the personal data using a hashing algorithm;
    signing by the first processor the hash value with a digital signature created using a first private key paired with a first public key;
    transmitting by the first processor, over a network, the signed hash value and the first public key from the first smartphone to a block chain database;
    receiving by the first processor a first transaction number from the block chain database; and
    transmitting by the first processor the first transaction number and the personal data to the second processor of the second smartphone;
    using by the second processor the first transaction number to retrieve the signed hash value and the first public key from the block chain database;
    hashing by the second processor the personal data using the hashing algorithm to create a generated hash value;
    verifying by the second processor that the hash value in the signed hash value is the same as the generated hash value,
    verifying by the second processor that the signed hash value was signed with the first private key; and
    creating by the second processor a certification to certify that the personal data was signed using the first private key and was stored to the block chain, the certification used for verifying the identity of the user.

2. The method of claim 1, wherein the certification includes the first transaction number and the personal data or selected fields of the personal data.

3. The method of claim 2, wherein the certification is signed with a second private key paired with a second public key on the second smartphone.

4. The method of claim 3, wherein the signed certification record is transmitted, over a network, to the block chain database.

5. The method of claim 4, wherein a second transaction number is received by the second smartphone from the block chain database.

6. The method of claim 1, wherein at least a part of the personal data is coded in a barcode or QR code.

7. A non-transitory computer-readable medium storing a computer program for managing an identity of a user as executed by a first processor of a first smartphone and a second processor of a second smartphone, the computer-readable medium comprising a first set of instructions that when executed causes the first processor to:
    receive personal data identifying the user from an identification card, wherein the personal data is received on the first smartphone;
    create a hash value from the personal data using a hashing algorithm;
    sign the hash value with a digital signature created using a first private key paired with a first public key;
    transmit, over a network, the signed hash value and the first public key from the first smartphone to a block chain database;
    receive a first transaction number from the block chain database; and
    transmit the first transaction number and the personal data to the second processor of the second smartphone;
    wherein the computer-readable medium comprising a second set of instructions that when executed causes the second processor to;
    use the first transaction number to retrieve the signed hash value and the first public key from the block chain database;
    hash the personal data using the hashing algorithm to create a generated hash value;
    verify that the hash value in the signed hash value is the same as the generated hash value;
    verify that the signed hash value was signed with the first private key; and
    create a certification to certify that the personal data was signed using the first private key and was stored to the block chain, the certification used for verifying the identity of the user.

8. The computer-readable medium of claim 7, wherein the certification includes the first transaction number and the personal data or selected fields of the personal data.

9. The computer-readable medium of claim 8, wherein the certification is signed with a second private key paired with a second public key on the second smartphone.

10. The computer-readable medium of claim 9, wherein the signed certification record is transmitted, over a network, to the block chain database.

11. The computer-readable medium of claim 10, wherein a second transaction number is received by the second smartphone from the block chain database.

12. The computer-readable medium of claim 7, wherein at least a part of the personal data is coded in a barcode or QR code.

13. A method for managing an identity of a user as executed by a first processor of a first device and a second processor of a second device, the method comprising operations of:
    receiving by the first processor personal data identifying the user from an identification card, wherein the personal data is received on the first device;
    creating by the first processor a hash value from the personal data using a hashing algorithm;
    signing by the first processor the hash value with a digital signature created using a first private key paired with a first public key;
    transmitting by the first processor, over a network, the signed hash value and the first public key from the first device to a block chain database;
    receiving by the first processor a first transaction number from the block chain database; and
    transmitting by the first processor the first transaction number and the personal data to the second processor of the second device;
    using by the second processor the first transaction number to retrieve the signed hash value and the first public key from the block chain database;
    hashing by the second processor the personal data using the hashing algorithm to create a generated hash value;

verifying by the second processor that the hash value in the signed hash value is the same as the generated hash value;

verifying by the second processor that the signed hash value was signed with the first private key; and creating by the second processor a certification to certify that the personal data was signed using the first private key and was stored to the blockchain, the certification used for purposes of verifying the identity of the user.

14. The method of claim 13, wherein the certification includes the first transaction number and the personal data or selected fields of the personal data.

15. The method of claim 14, wherein the certification is signed with a second private key paired with a second public key on the second device.

16. The method of claim 15, wherein the signed certification record is transmitted, over a network, to the block chain database.

17. The method of claim 16, wherein a second transaction number is received by the second device from the block chain database.

18. The method of claim 13, wherein at least a part of the personal data is coded in a barcode or QR code.

19. A system for managing an identity of a user, comprising:

a first device having a first processor configured to:
  receive personal data identifying the user from an identification card, wherein the personal data is received on the first device;
  create a hash value from the personal data using a hashing algorithm;
  sign the hash value with a digital signature created using a first private key paired with a first public key;
  transmit, over a network, the signed hash value and the first public key from the first device to a block chain database;
  receive a first transaction number from the block chain database; and
  transmit the first transaction number and the personal data to a second device; and the second device having a second processor configured to:
  use the first transaction number to retrieve the signed hash value and the first public key from the block chain database;
  hash the personal data using the hashing algorithm to create a generated hash value;
  verify that the hash value in the signed hash value is the same as the generated hash value;
  verify that the signed hash value was signed with the first private key; and
  create a certification to certify that the personal data was signed using the first private key and was stored to the block chain, the certification used for verifying the identity of the user.

20. The system of claim 19,
wherein the certification includes the first transaction number and the personal data or selected fields of the personal data,
wherein the certification is signed with a second private key paired with a second public key on the second device, and
wherein the signed certification record is transmitted, over a network, to the block chain database.

21. The system of claim 19, wherein a second transaction number is received by the second device from the block chain database.

22. The system of claim 19,
wherein the first device executes an application provided by an entity allowing for communication between the first device and the second device, and
wherein the second device executes the application provided by the entity allowing for communication between the first device and the second device.

* * * * *